(12) United States Patent
Jansson

(10) Patent No.: US 6,209,745 B1
(45) Date of Patent: Apr. 3, 2001

(54) POP UP FLUSH-MOUNT GAS CAP

(75) Inventor: Erik Tommy Jansson, Stamford, CT (US)

(73) Assignee: Jansson and Associates Masterbuilders, Inc., Stamford, CT (US)

( * ) Notice: Subject to any disclaimer, the term of this patent is extended or adjusted under 35 U.S.C. 154(b) by 0 days.

(21) Appl. No.: 09/326,086

(22) Filed: Jun. 4, 1999

(51) Int. Cl.$^7$ .................................................... B65D 41/04
(52) U.S. Cl. ................ 220/288; 220/86.2; 220/DIG. 33; 220/DIG. 34
(58) Field of Search ................... 200/DIG. 33, DIG. 34, 200/86.2, 86.1, 255, 288; 215/204, 220, 329

(56) References Cited

U.S. PATENT DOCUMENTS

| D. 400,838 | 11/1998 | Stahel . |
| D. 402,248 | 12/1998 | Triebold . |
| 2,866,572 | * 12/1958 | Llewhellin ............... 220/DIG. 33 X |
| 3,476,285 | 11/1969 | De Pew . |
| 4,189,059 | 2/1980 | Shaw . |
| 4,811,763 | 3/1989 | Kupske . |
| 5,415,316 | 5/1995 | Pemberton et al. . |
| 5,524,786 | * 6/1996 | Skudlarek ................ 220/DIG. 33 X |

FOREIGN PATENT DOCUMENTS

| 658484 | * 6/1995 | (EP) . |
| 2129783 | * 5/1984 | (GB) . |
| 2239007 | * 6/1991 | (GB) . |

* cited by examiner

*Primary Examiner*—Nathan J. Newhouse
(74) *Attorney, Agent, or Firm*—St. Onge Steward Johnston & Reens LLC

(57) ABSTRACT

A pop up gas cap for a gas tank includes an outer sleeve and a seal cap engaging the sleeve upon actuation of a lid which rotatably brings the seal cap and sleeve in a lock in position. After locking the sleeve and the gas cap, the lid is adapted to move between an outer pop position and an inner flush position thereof, in which the lid is flushed with the gas tank's outer surface.

12 Claims, 3 Drawing Sheets

POP UP FLUSH-MOUNT GAS CAP

FIELD OF THE INVENTION

The invention relates to a removable filler cap assembly for a fuel tank of motor vehicles. Particularly, the invention relates to a pop up gas cap for closing fuel tanks of motorcycles and powerboats.

SUMMARY OF THE INVENTION

Numerous filler cap assemblies are known in the art. Many of the known gas cap arrangements use gripping handles, as for example, U.S. Pat. No. 2,866,572 (Llewhellin). This patent discloses a flush-fitting filler cap assembly designed for aircraft, comprising a carrier in the form of a shallow hollow cup having an inwardly directed circumferential flange. The carrier presses down on a diaphragm contacting a sealing ring within a sleeve via a bayonet slot connection. The carrier is rotated by a finger bar. A cover plate having a slot to accommodate the finger bar is necessary to provide a flush surface wherein a spring biases the cover plate up against the carrier's inwardly directed circumferential flange.

Still another arrangements utilize keys which are mounted pivotally on top of the gas caps. Thus, for example, U.S. Pat. No. 3,476,285 (De Pew) discloses a filler cap assembly, comprising a closure plate formed with a pivotal key thereon and having alternate sections of greater and lesser diameter. A cup-shaped pressure plate having a shaft, a spring biasing the pressure plate upward, a resilient sealing ring. Upon pivoting the key having a curved cam surface operating against a wear plate, the closure plate is forced against the pressure plate when the key is in a closed position.

U.S. Pat. No. 4,189,059 (Shaw) discloses a filler cap assembly comprising a plug member having an O-ring seal, a retaining member, a locking member, a compression spring and an operating shaft. The compression spring biases the locking member away from the plug and retaining members. To lock the plug member in the tank opening, a key is rotated about the axis of the operating shaft, drawing fingers of the locking member upward into engagement with an adapter contacting the retaining member, thereby compressing the O-ring against the plug member.

U.S. Pat. No. 4,811,763 (Kupske) discloses an arrangement of a keyless gas cap for filling motorcycle fuel tanks. The gas cap comprises a short pipe piece housed within a cylinder means, and a coil spring. The gas cap is hingedly mounted on the gas tank and protrudes thereabove in a closed position thereof.

Many of the above discussed arrangements using a handle means for opening and closing of gas tanks may have unappealing designs of gas filling arrangements, which are likely to be particularly noticeable on motorcycles and powerboats.

Further, many of the known gas cap assemblies may likely not have a means adapted to receive an excess of fuel if the gas tank has been overfilled.

SUMMARY OF INVENTION

The novelty of the present invention is a flush-mount gas cap which is opened by unseating a pop up mechanism which is operatively connected with a lid adapted to be angularly displaced in order to unscrew a seal cap from engagement with a gas tank.

The flush-mount gas cap according to the invention includes a seal cap having a recessed interior which receives a spring-loaded shaft. The shaft's top end is fixed to an underside of the lid, whereas the shaft's lower end has a pin extending transversely to the shaft. The seal cap's bottom is formed with a pair of intersecting shallow and deep recesses having different axial cross-sectional depths, so that the pin selectively engages the recesses upon controllably displacing the lid. When the pin is received in the shallow recess, the cap's lid is in its flush position in which the lid's top surface is juxtaposed with the seal cap's upper surface. Alternatively, upon engagement of the pin in the deep recess, the cap is in its pop up position in which the cap's top surface is spaced from the sleeve's upper surface.

The seal cap includes an overfill compartment which is formed in the seal cap at distance from the bottom thereof and is in flow communication with the gas tank in the pop up position of the cap. This is achieved by having a channel which opens at opposite ends thereof into the overfill compartment and the deep recess respectively.

The flush gas cap according to the invention may be easily adapted for use with existing arrangements for filling fuel tanks of motor vehicles. In order to utilize the inventive gas cap with the existing arrangements, it is necessary that the seal cap of the invention be provided with a means for engaging the inner surface of an outer sleeve which has been mounted on a motor vehicle.

The invention also contemplates a flush-mount gas cap assembly including an outer sleeve or sleeve formed with an upper mounting flange and having a hollow inner surface which receives a fuel discharge nozzle during a filling operation. After the gas tank is filled with fuel, the seal cap releasably engages an interior of the outer sleeve to advance to a position in which the sleeve's top upper mounting flange is located either below or substantially flush with the seal cap's top surface. The spring-loaded seal cap is then displaced inwardly and, upon applying a rotational torque, the pin engages the shallow recess so that the lids 's upper surface is substantially flushed with the seal cap's top surface and with the gas tank's surface.

It is therefore an object of the invention to provide an improved gas mount assembly overcoming drawbacks of the prior art.

Still another object of the present invention is provide a pop up gas mount assembly adapted to have an overfill cap, which is in flow communication with the gas tank.

Another object of the present invention is to provide a pop us gas mount assembly that may be easily adapted to be used with existing arrangements for filling tanks of motor vehicles.

Yet another object of the invention is to provide a pop up gas assembly which is aesthetically appealing.

BRIEF DESCRIPTION OF THE DRAWINGS

The above and other object, features and advantages will become more readily apparent from the following description of the invention, references being made to the accompanying drawings, in which.

Figure 1:
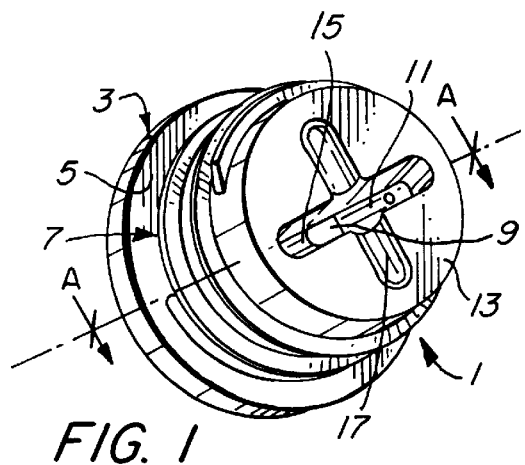
FIG. 1 is a side perspective view of a gas cap according to the invention.

Although the following description relates to a gas cap assembly shown in the drawings with its axis in a vertical direction, it will be understood that the assembly according to this invention could be used in any position. Therefore the words "upper" and "lower" have merely been used herein for convenience of description and are intended to cover a gas cap assembly however oriented.

DETAILED DESCRIPTION OF THE INVENTION

FIG. 1 illustrates a gas cap 1 including a lid 3 which is formed with an underside 5. A shaft 9 extending along a shaft axis A-A is mounted rotatably fixed on the underside 5. A free end of the shaft 9 is provided with a pin 11 extending transversely to the axis A—A and rotationally fixed with the shaft 9. A seal cap 9 provided with a bottom 13 is mounted on the shaft, so that the gas cap 1 and the seal cap are axially and rotationally movable relative to one another. The axial motion between a pop up and flush positions of the lid 3 is shown and explained in reference to FIGS. 2–4. In order to articulate these positions of the gas cap, the bottom 13 of the seal cap 7 has a pair of intersecting longitudinal recesses 15, 17 provided with different cross-sectional depths and selectively receiving the pin 11 upon axial displacement of the shaft 9.

Figure 2:
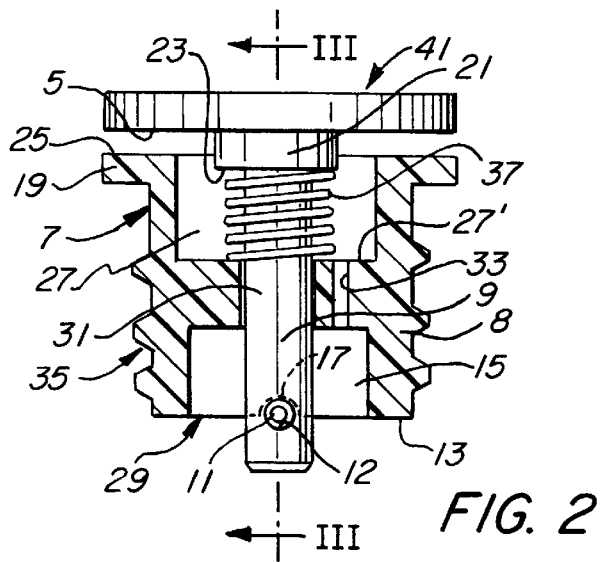
FIG. 2 is a cross sectional view of the gas cap of FIG. 1 in its intermediate position taken along axis A—A.

As illustrated in FIG. 2, the shaft 9 is provided with a flange 21 attached to the underside 5 and having an abutment surface 23. The seal cap is formed with an upper flange 19 having an upper surface 25 which faces the underside 5 of the lid 3. An interior of the seal cap 7 is recessed and includes an upper compartment 27, a lower compartment 29 and a shaft pocket 31 which opens at opposite ends thereof into the compartments 27, 29. Collectively, compartments 27, 29 and pocket 31 form a channel opening at opposite ends into the upper surface 5 and bottom 13 of the seal cap and traversed by the shaft 9.

Figure 3:
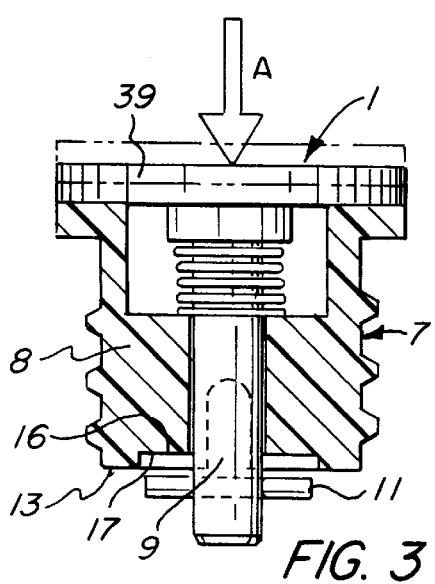
FIG. 3 is a cross sectional view of the gas cap of FIG. 1 taken along lines III—-III and illustrating the gas cap in its flush position.
Figure 4:
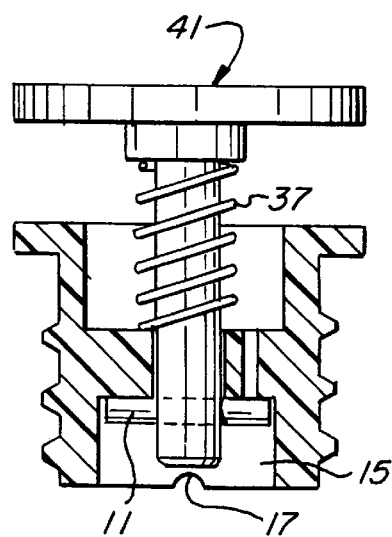
FIG. 4 is a cross sectional view of the gas cap of FIG. 1 in its pop up position.

The lower compartment 29 formed by the recesses 15 and 17 is a two-tier compartment, in which the first tier corresponds to a depth of the shallow recess 17 (FIGS. 3, 4), and the second tier corresponds to a depth of the deep recess 15 (FIGS. 2, 4). The shallow recess 17 is deep enough to harbor the pin 11 so that the pin would not be arbitrarily able to slip off or disengage this recess. As seen in FIGS. 24, each of the recesses' bottoms 14,16 forms an abutment surface for the pin 11 upon lodging thereof in the respective recess.

The shaft pocket 31 has an inner periphery which is radially adjacent to the shaft in order to prevent the upper and lower compartments 27, 29 from fluid intercommunication. However, the seal cap 7 is made of a fuel resistant material having a low friction coefficient which allows the shaft 9 to slide without substantial impediment between the flush and pop up positions of the gas cap 1. The shaft pocket 31 has a cylindrical cross-section conforming to a cross-section of the shaft 9. However, it is possible to have different cross-sections of this chamber as long as an outer periphery of the shaft 9 conforms and is in contact with an inner surface of the shaft pocket 31.

Figure 6:
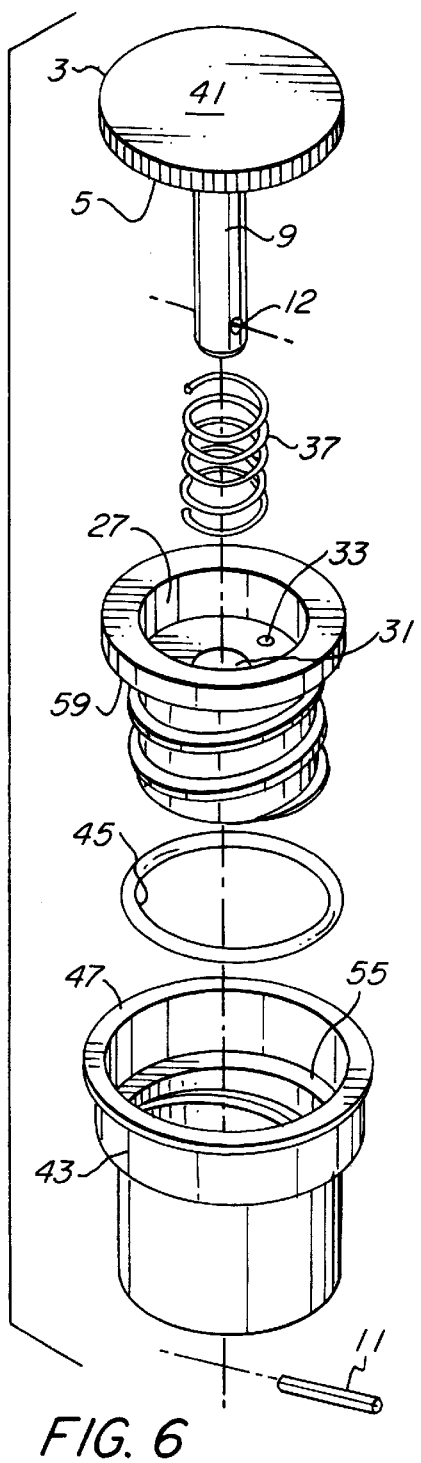
FIG. 6 is an exploded perspective view of a gas cap assembly according to the invention.

The upper compartment 27 as shown in FIG. 2 may serve as an overfill cap as will be explained herebelow. A narrow channel 33, which is recessed in a body 8 of the seal cap 7 and is spaced radially apart from the shaft pocket 31, opens at opposite ends thereof into the upper and lower compartments 27, 29 respectively. This channel provides air communication and, if necessary, liquid fuel communication in case of overfilling of a gas tank 100 (FIG. 6). As shown in FIG. 2, only one such channel is illustrated but, in fact, it is conceivable to have the seal cap with more than just one narrow channel. The upper compartment 27 is shown to be generally annular. However, it may have different cross-sections.

Although the channel 33 is shown to be axial, it is conceivable to have it inclined with respect to axis A—A. The channel as illustrated opens into the deep recess 15. However, it is possible to form this channel in such a manner that it will open into the shallow compartment 17. The channel should have a cross-section which is sized to allow an excessive amount of fuel to pass into the upper compartment without, however, overfilling it.

An outer periphery of the seal cap 7 is provided with a thread 35, which may engage a female thread formed on sleeves of existing gas filling arrangements.

An upper end of the shaft 9 is surrounded by a coil spring 37 which engages the abutment surface 23 of the flange 21 and the upper compartment's bottom 27' by its opposite ends. The spring is selected in such a way as to exert a sufficient axial force overcoming friction between the shaft 9 and the inner periphery of the intermediate chamber 35 and to bias the lid 3 in its pop up position.

As shown here, the pin 11 extends through a hole 12 formed in the vicinity of the free end of the shaft 9 and somewhat spaced therefrom. The pin 11 engages the shallow recess 17 which corresponds to the flush position of the lid 3, in which it is slightly spaced above the upper surface 25 of the seal cap 7.

FIG. 3 illustrates a position of the lid 3, which is either immediately prior to, or immediately subsequent to the flush position of the lid 3 as shown in FIG. 2. In order to bring the lid 3 in the flush position, first an external axial force 'A' overcoming the spring's counterforce is applied to the lid 3 for displacing it in a position in which the pin 11 is spaced axially inwardly from the bottom 13, as shown in FIG. 3. Axial displacement of the lid is arrested by the upper surface 25 of the seal cap and corresponds to the position of the pin 11 shown in FIG. 3a. Once the pin is placed outside the body 8 of the seal cap, the shaft is able to rotate upon applying a torque to the lid 3. As a result of such rotation, the pin 11 is angularly displaced in order to be to be in alignment with the shallow recess 17. Due to the spring's action and after removal of the external force 'A', the pin 11 is pulled up into the recess 17 as shown in FIG. 2. A peripheral edge 39 is machined with a textured or knurling surface which facilitates rotational engagement between a user and the lid 3.

In order to bring the lid 3 in the pop up position, as shown in FIG. 4, the lid 3 is first displaced axially downwardly from the shallow recess 17 in the position illustrated in FIG. 3. Since the lid 3 and shaft 9 are rotationally displaceable in this position with respect to the seal cap 7, the pin 11 may be aligned with the deep recess 15 and, upon cessation of the force 'A', the pin is guided axially upwardly along this recess and comes into contact with the bottom 14. Thus, the lid 3 is popped up by action of the spring 37 and is located at a distance from the upper surface 25 of the seal cap 7.

The seal cap 7 is made of a fuel resistant plastic material. The rest of the shown parts including the lid, shaft and pin may be made of stainless steel or aluminum.

Figure 5:
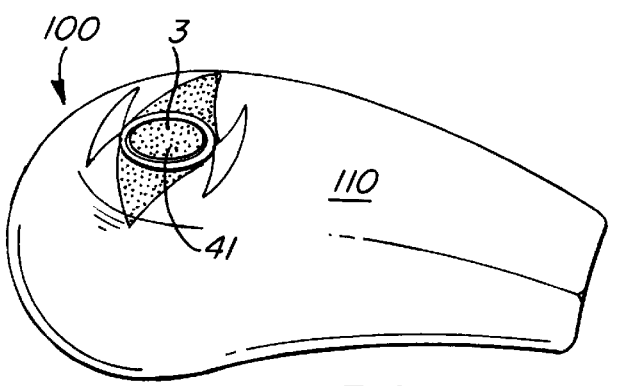
FIG. 5 illustrates a prior art gas cap assembly.

FIG. 5 represents a gas cap assembly which may be often seen on existing gas tanks of motorcycles or powerboats. The gas cap assembly has a gas cap 105 extending from an outer decorative surface 110 of a tank 100. This decorative outer surface 110 of a gas tank may have numerous designs, for example, flames. The gas cap as shown in this figure interrupts a pattern of flames, which are decoratively imprinted on the tank, and may contribute to a less appealing design.

Figure 5A:
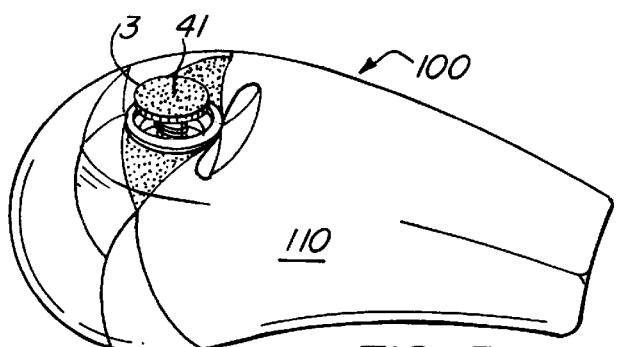
FIG. 5A is a perspective view of a gas tank with a gas cap assembly of the invention which includes the gas cap shown in FIG. 1.
Figure 7:
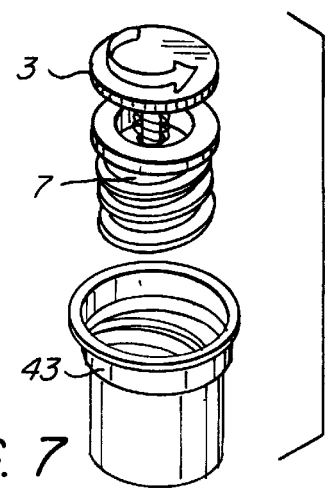
FIG. 7 is another exploded view of a gas cap assembly according to the invention.

In contrast, the gas assembly according to the invention (FIG. 5A) includes the lid 3 which in its flush position as illustrated here has its upper surface 41 lying substantially in a plane of the outer surface 110 of the gas tank 100. It is easy to see that a decorative pattern on the surface 110 is substantially uninterrupted in the flush position of the lid 3 thereby making the whole design more appealing.

Referring to FIG. 6 the gas assembly according to the invention includes an outer sleeve 43 formed with a mounting flange 47. The sleeve 43 is mounted on the gas tank 100 to have its mounting flange 47 lying substantially flush with the surrounding surface 110 of the tank 100. The sleeve further includes an inner supporting flange 55 which is juxtaposed with an inner surface 59 of the mounting flange 19 of the seal cap. In order to provide reliable engagement between these surfaces, a sealing member, for example, an elastomeric O-ring 45 (FIGS. 8–10) is inserted therebetween during an assembling operation.

The shaft 9 of the lid 3 is inserted in the shaft pocket 31 to sealingly engage an inner periphery thereof and is provided with the spring 37, as is explained above. After the lid 3 has been inserted in the sleeve 43, the hole 12 of the shaft 9 receives the pin 11 which is keyed thereto.

Figure 8:
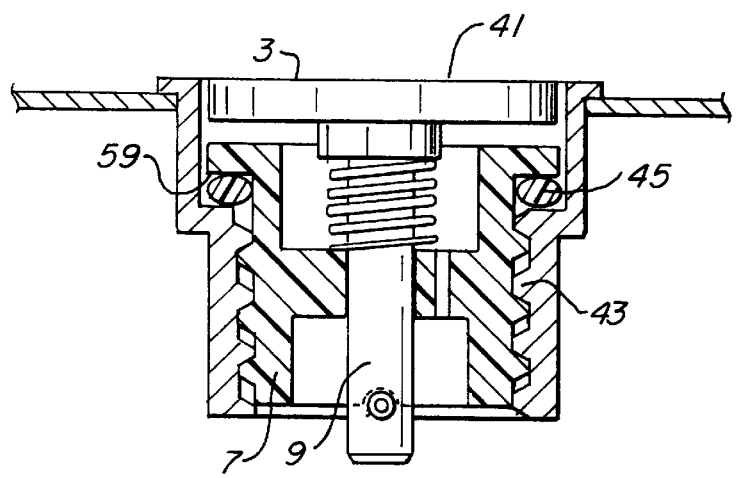
FIG. 8 is an axial cross-sectional view of the assembly of FIG. 5 showing the cap gas of FIG. 1 in a flush position thereof.
Figure 9:
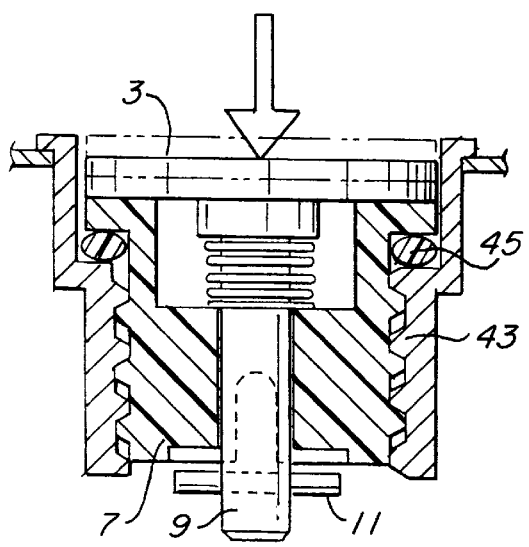
FIG. 9 is the same view as the one illustrated in FIG. 8 but showing the gas cap of FIG. 1 in an intermediary position.
Figure 10:
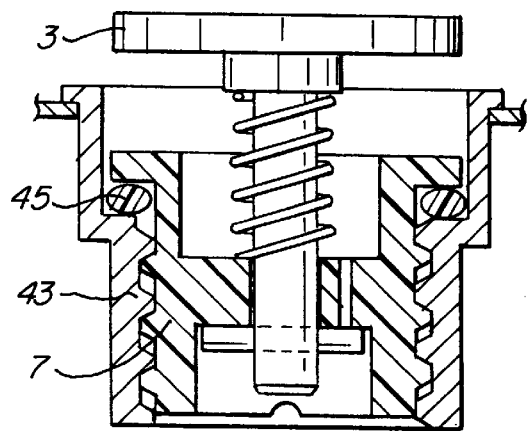
FIG. 10 is the same view as the one of FIG. 8 but showing the gas cap of FIG. 1 in a pop up position.

The gas cap assembly operates in a simple manner, which is illustrated in FIGS. 8–10. When the gas tank is filled, as illustrated in FIG. 8, the gas cap 1 is screwed in the sleeve 43 which is formed with a female thread 49 mating with the thread 35 of the seal cap 7. The threaded engagement between the sleeve and the seal cap provides a reliable seal preventing fuel from leaking outside the gas tank.

As further shown in FIG. 8, the lid 3 is in its flush position in which the top surface 41 thereof is surrounded by the mounting flange 47 and lies substantially in the same plane. In order to fill the gas tank, the user exerts the force 'A' directed downwardly upon the top surface 41 of the lid 3 thereby bringing the lid and the shaft in the position of FIG. 9, in which the pin 11 disengages the shallow recess 15. Once the pin is out of this engagement, it is sufficient to angularly displace the lid at a predetermined angle, for example a 90⁰ angle, so that the pin is aligned with the deep recess 17. After this alignment is brought about the lid 3 is released and, under the spring's action, it is displaced in the pop up position as illustrated in FIG. 10.

Having brought the lid in its pop up position, the user may further unscrew the seal cap from its engagement with the sleeve by actuating the lid which in its pop up position is rotationally fixed with the sleeve. Once the gas cap is unscrewed the user may proceed with filling the gas tank.

Figure 11:
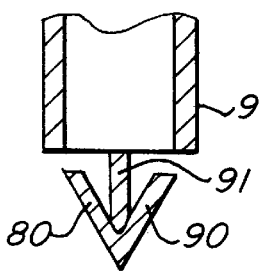
FIG. 11 is a cross-sectional view of a stop according to one of the aspects of the present invention.

Another embodiment of a pin arrangement is illustrated in FIG. 11 and includes a pin 91 which is mounted on a lower end of a rod 93 extending inwardly from the shaft 9. This rod may be machined as an integral part of the shaft 9 or may be a separate part. The pin 91 has a pair of elastically deformable leaves 80, 90 which are forcibly pushed toward one another while being displaced through the shaft pocket 31. Due to inherent elasticity of the leaves which are made of, for example, spring steel, the leaves tend to straighten out immediately after passing this pocket.

It is understood that the embodiments of the invention are not limited to the details shown and described herein but intend it cover all such changes and modifications as are encompassed by the scope of the appended claims.

What I claim is:

1. A gas tank formed with a smooth outer surface, said gas tank comprising:

a gas filling opening formed in the outer surface of the tank;

a sleeve mounted in said opening and having an outer end which terminates generally flush with the outer surface of the tank, said sleeve having an inner bore with a recessed threaded segment;

a seal cap sized to fit inside the inner bore and having an external thread which meshes with the recessed threaded segment;

a lid having an outer surface; and a coupling between said seal cap and said lid to enable said lid to move relative to said seal cap between first and second positions, said first position of the lid placing said outer surfaces of said lid and tank substantially flush with each other, said lid projecting above said outer surface of said tank for unscrewing said seal cap from said sleeve in said second position of said lid and being rotatable relative to said seal cap upon displacing said lid inwardly from said outer surface of the tank from said first position.

2. A gas tank formed with a smooth outer surface and comprising:

a gas filling opening formed in the outer surface of the tank;

a sleeve mounted in said opening and having an outer end which terminates generally flush with the outer surface of the tank, said sleeve having an inner bore with a recessed threaded segment;

a seal cap sized to fit inside the inner bore and having an external thread which meshes with the recessed threaded segment;

a lid having an outer surface; and a coupling between said seal cap and said lid to enable said lid to move relative to said seal cap between first and second positions, said first position of the lid placing said outer surfaces of said lid and tank substantially flush with each other, said lid projecting above said outer surface of said tank for unscrewing said seal cap from said sleeve in said second position of said lid, wherein said coupling includes:

first and a second recesses in a bottom of said seal cap;

a shaft fixedly mounted on said lid and extending through said seal cap;

a stop formed on a free end of said shaft and selectively engaging said recesses at said first and second positions of said lid, said seal cap and lid being rotatably fixed in said first and second positions when said stop engages said respective recesses; and a spring biasing said lid from said first position to said second position.

3. The gas cap defined in claim 2 wherein said recesses extend transversely to one another and have shallow and deep depths which respectively define said first and second positions of the lid.

4. The gas cap defined in claim 2 wherein said seal cap is formed with:

an overfill compartment open to the outer surface of the tank; and a vent traversing said seal cap to terminate at the bottom of said seal cap and at said overfill compartment.

5. The gas cap defined in claim 2 wherein said stop is a pin.

6. A cap for opening and closing a threaded opening, said cap comprising:

a seal cap having an external thread engaging the threaded opening;

a lid connected to said seal cap and having an outer surface; and a coupling between said seal cap and said lid to enable said lid to move relative to said seal cap between first and second positions, said lid unscrewing said seal cap from said opening in said second position of said lid; and a vent traversing said seal cap and terminating at a bottom of said seal cap.

7. The cap defined in claim 6 wherein said seal cap extends along a longitudinal axis and has an a recess in the seal cap.

8. The cap defined in claim 6 wherein said coupling includes a pair of first and second shallow and deep intersecting recesses formed in the bottom of said seal cap and engageable by said lid in said first and second positions thereof.

9. The cap defined in claim 6 wherein said lid is rotatable relative to said seal cap upon displacing said lid inwardly from said first position, said seal cap and lid being rotatably fixed in said first and second positions.

10. The cap defined in claim 9 wherein said lid is provided with a shaft extending through said seal cap and having a free end which is formed with a stop extending transversely to said shaft, said seal cap having bottom which is provided with first and second recesses, so that said stop upon disengaging from a first recess of the seal cap is aligned with said second recess.

11. The cap defined in claim 10 wherein said stop includes a pair of flexible arms.

12. The cap defined in claim 6 wherein said coupling further includes a spring biasing said lid and said seal cap apart.

* * * * *